United States Patent [19]
Ishihara et al.

[11] Patent Number: 5,599,564
[45] Date of Patent: Feb. 4, 1997

[54] AUTOMATIC STAMPER EXCHANGE DEVICE AND INJECTION MOLDING APPARATUS EMPLOYING THE EXCHANGE DEVICE

[75] Inventors: Koichi Ishihara; Kiyoshi Takii; Kozo Kawarazaki; Kazuhiro Oishi; Nobuyuki Hirayama, all of Shizuoka, Japan

[73] Assignee: Sony Corporation, Tokyo, Japan

[21] Appl. No.: 364,137

[22] Filed: Dec. 27, 1994

[30] Foreign Application Priority Data

Dec. 27, 1993 [JP] Japan ................................ 5-329320

[51] Int. Cl.⁶ .................................................. B29C 45/40
[52] U.S. Cl. ........................................ 425/190; 425/192 R
[58] Field of Search .............................. 425/190, 192 R, 425/193, 150

[56] References Cited

U.S. PATENT DOCUMENTS 5,232,805  8/1993  Novak et al. ............................ 118/712

FOREIGN PATENT DOCUMENTS

0544902A1  9/1993  European Pat. Off. .
0594255A1  4/1994  European Pat. Off. .

*Primary Examiner*—Tim Heitbrink
*Attorney, Agent, or Firm*—Limbach & Limbach L.L.P.

[57] ABSTRACT

An automatic stamper exchange device for effecting automatic stamper exchange to and from a mold of an injection molding apparatus includes a first stamper housing unit, a second housing unit, a stamper mounting and dismounting unit and a stamper supplying unit. A used-up stamper is housed in the first stamper housing unit, and a new stamper is housed in the second housing unit. The stamper mounting and dismounting unit dismounts the new stamper from the metal mold or mounts the used-up stamper on the metal mold. The stamper supplying unit houses the used-up stamper dismounted by the stamper mounting and dismounting unit in the first stamper housing unit or takes out the new stamper housed in the second stamper housing unit to supply it to the stamper mounting and dismounting unit. The automatic stamper exchange device operates in such a manner that, after the end of the injection molding operation by the metal mold, the used-up stamper is dismounted from the metal mold by the stamper mounting and dismounting unit so as to be housed in the first housing unit, and the new stamper is taken out by the stamper supplying unit from the second housing unit so as to be mounted on the metal mold by the stamper mounting and dismounting unit.

14 Claims, 8 Drawing Sheets

AUTOMATIC STAMPER EXCHANGE DEVICE AND INJECTION MOLDING APPARATUS EMPLOYING THE EXCHANGE DEVICE

BACKGROUND

1. Field of the Invention

This invention relates to an automatic stamper exchange device and an injection molding apparatus. More particularly, it relates to an automatic stamper exchange device having the function of automatically mounting and dismounting a stamper and an injection molding apparatus employing such exchange device.

2. Background of the Invention

There has been proposed an optical disc having a disc substrate formed of a synthetic resin having light transmitting properties, such as acrylic resin or polycarbonate resin, and a recording layer formed thereon, in which light is radiated as an extremely small light spot on the recording layer for high-density recording of information signals, such as music or picture signals, reading out the recorded information signals and rewriting the recorded information signals. Such optical disc is wisely used in a recording and/or reproducing system for audio or video signals or in an external storage device for an electronic computer.

Such optical disc has a transparent disc substrate having a pattern of lands and recesses, such as pits or grooves, representing information signals, formed thereon, a reflective film, as a recording film, such as a thin film of metal, such as aluminum, formed on the disc substrate, and a protective film for protecting the reflective film against the moisture or oxygen in the atmosphere, formed on the reflective film. For reproducing the information recorded on the optical disc, the light beam is radiated on the pits from the side of the transparent substrate and the return light detected for detecting the information.

The disc substrate of the optical disc is formed by setting a stamper having pre-set information signals recorded as a pattern of fine lands and recesses, or so-called pits and grooves, set on a metal mold of an injection molding machine, and by injecting a heated and molten resin material, such as polycarbonate resin, into the inside of the metal mold. On a surface of the molded disc substrate, which is to be a signal recording surface, is formed an aluminum reflective film, such as by vapor deposition or sputtering, and a protective film of, for example, a UV curable resin, is formed thereon.

In the fabrication of the optical discs, when a pre-set number of the disc substrates of the optical discs, each having a set of information signals recorded thereon, are completely produced, optical discs each having another set of information signals recorded thereon are produced as a next process. Thus it becomes necessary to exchange a stamper for a new one when the disc substrates of the optical discs having one set of the information signals recorded thereon have been completed, in order to produce the disc substrate of the optical disc having another set of information signals recorded thereon.

Up to now, stamper exchange was carried out entirely by man power. For example, when a pre-set number of disc substrates has been fabricated, an operator introduces a rod-shaped jig into a center hole in the stamper mounted on the metal mold for dismounting the stamper from the metal mold. A new stamper is then mounted on the metal mold using a similar jig.

Since the stamper exchange is performed by a manual operation by an operator, it may occur that the operator may inadvertently touch the signal recording surface of the stamper with his or her finger during the exchange operation, thereby contaminating or damaging the information recording surface. If the stamper should become defective, the disc substrates of the optical disc duplicated from the stamper become defective in their entirety, thus rendering it impossible to correctly read out playback signals and lowering the yield or operational reliability.

On the other hand, both the used-up stampers and the new stampers are housed by the operator in stamper casings and stored in the housing unit. Consequently, since it becomes necessary to take out the stampers from the stamper casing, tactile contact with the stamper occurs unavoidably.

OBJECTS AND SUMMARY OF THE INVENTION

It is therefore an object of the present invention to provide an automatic stamper exchange device which resolves the above-mentioned problems.

It is another object of the present invention to provide an injection molding apparatus which resolves the above-mentioned problems.

According to the present invention, there is provided an automatic stamper exchange device for effecting automatic stamper exchange to and from a mold of an injection molding apparatus. The exchange device includes a first stamper housing unit, a second housing unit, a stamper mounting and dismounting unit and a stamper supplying unit. A used-up stamper is housed in the first stamper housing unit, and a new stamper is housed in the second housing unit. The stamper mounting and dismounting unit dismounts the used-up stamper from the metal mold or mounts the new stamper on the metal mold. The stamper supplying unit houses the used-up stamper dismounted by the stamper mounting and dismounting unit in the first stamper housing unit or takes out the new stamper housed in the second stamper housing unit to supply it to the stamper mounting and dismounting unit. The automatic stamper exchange device operates in such a manner that, after the end of the injection molding operation by the metal mold, the used-up stamper is dismounted from the metal mold by the stamper mounting and dismounting unit so as to be housed in the first housing unit, and the new stamper is taken out by the stamper supplying unit from the second housing unit so as to be mounted on the metal mold by the stamper mounting and dismounting unit.

According to the present invention, there is also provided an injection molding apparatus comprising a metal mold having a holder for holding a stamper on a setting surface, and an automatic stamper exchange device. The automatic stamper exchange device includes first and second stamper housing units and a stamper mounting and dismounting unit. The first stamper housing unit houses a used-up stamper and the second stamper housing unit houses a new stamper. The stamper mounting and dismounting unit dismounts the used-up stamper from the metal mold or mounts the new stamper on the setting surface of the metal mold. The injection molding apparatus operates in such a manner that, after the end of the injection molding operation by the metal mold, the used-up stamper is dismounted from the metal mold by the stamper mounting and dismounting unit so as to be housed in the first housing unit, and the new stamper is taken out from the second housing unit and mounted on the setting surface of the metal mold by the stamper mounting and dismounting unit so as to be held thereon by a holder.

According to the present invention, the operation of taking out the used-up stamper from the metal mold by the stamper mounting and dismounting unit and mounting a new stamper on the metal mold by the stamper mounting and dismounting unit after the end of the pre-set injection molding operation may be carried out automatically for reducing the time necessary for stamper exchange operations. According to the present invention, it becomes possible to prevent the stamper from being destructed or damaged by mistaken manual operations.

DESCRIPTION OF THE INVENTION

Referring to the drawings, illustrative embodiments of the present invention will be explained in detail.

Figure 1:
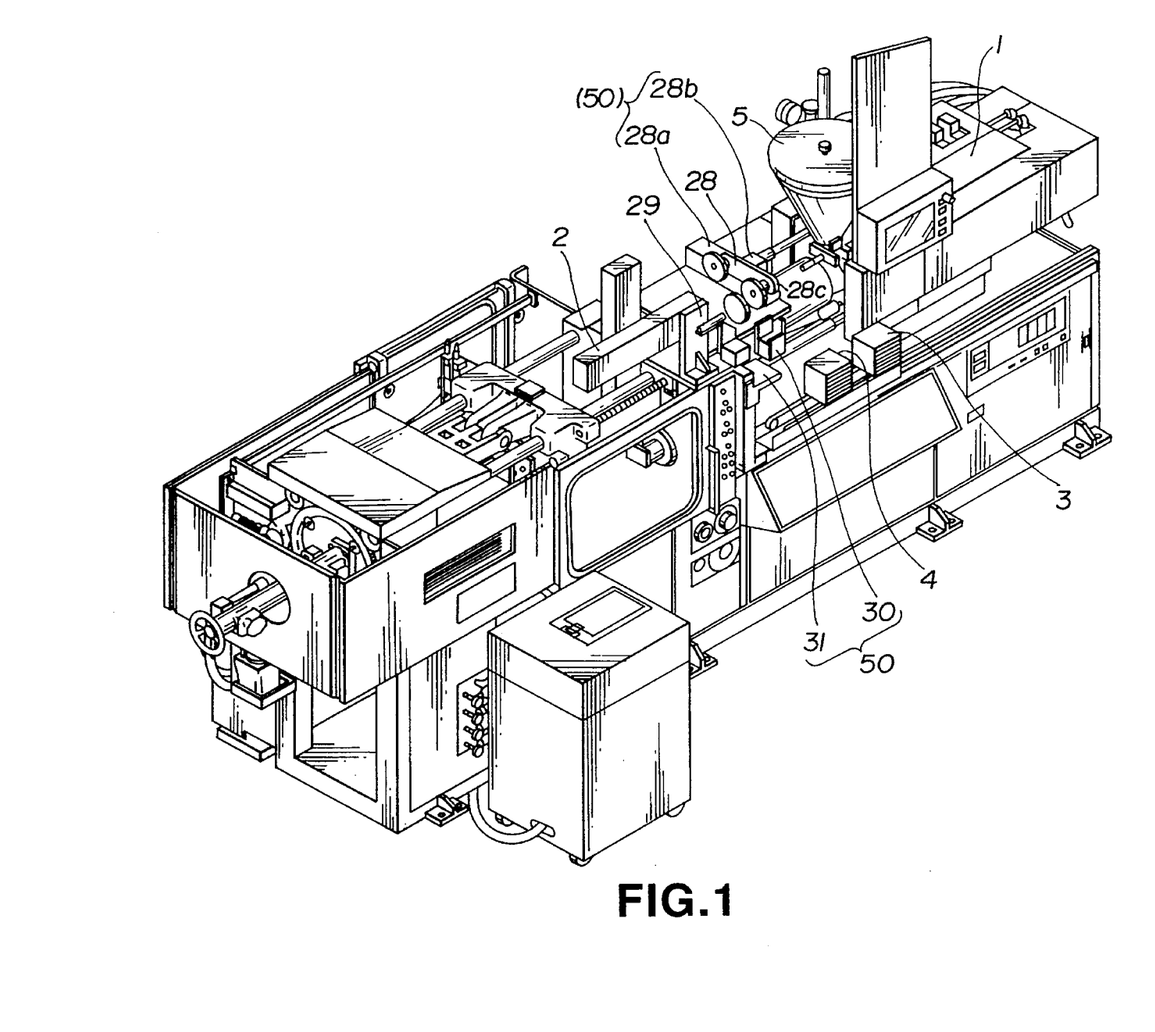
FIG. 1 is a perspective view showing an injection molding apparatus.

Referring first to FIG. 1, an injection molding apparatus for producing a disc substrate for an optical disc by injection molding includes an injection molding unit 1 on which a metal mold is set, and a stamper mounting and dismounting unit 2 for mounting and dismounting a metal mold. The injection molding apparatus also includes a first stamper housing unit 3 for housing a stamper casing holding a used-up stamper, a second stamper housing unit 4 for housing a stamper casing holding a new stamper, and a stamper supplying unit 50 for housing the used-up stamper dismounted by the stamper mounting and dismounting unit 2 in the first stamper housing unit 3 and for taking out a new stamper housed within the second stamper housing unit 4 and supplying the new stamper to the stamper mounting and dismounting unit 2.

The injection molding unit 1 has mounted thereon a metal mold in turn having a stamper mounted thereon. Molten polycarbonate resin, for example, is charged from a resin supply unit 5 into a cavity in the metal mold for molding a disc substrate.

The metal mold is made up of a fixed metal mold secured to the injection molding unit 1 and a movable metal mold movable into and out of contact with the fixed metal mold. The stamper, having a pattern of lands and recesses corresponding to information signals recorded thereon, is mounted on a major surface of the movable metal mold.

The resin supplying unit 5 injects the heated and molten resin into the cavity of the metal mold by a heated cylinder. The molten resin is hardened on contact with the low-temperature metal mold to produce a molded product that is a disc substrate conforming to the cavity shape. The pattern of lands and recesses on the stamper is transcribed onto one of the major surfaces of the disc substrate for forming pits corresponding to the information signals.

After a pre-set number of stampers, having the information signals recorded thereon, have been molded, the stamper mounting and dismounting unit 2 dismounts the used-up stamper from the metal mold and mounts a new stamper having recorded thereon another set of information signals on the metal mold. The stamper mounting and dismounting unit 2 has a registration unit 60 for aligning the center of the stamper with the center of a spool bushing provided on the metal mold.

Figure 2:
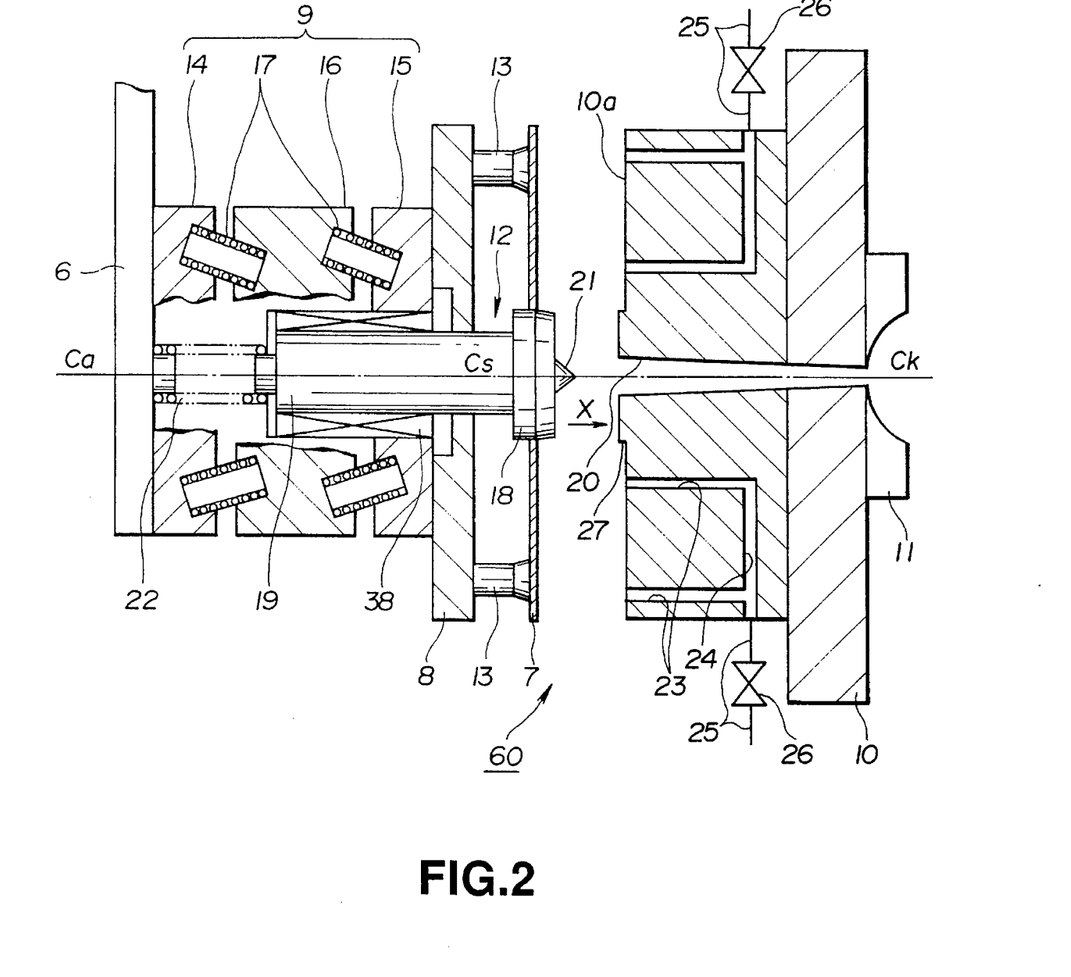
FIG. 2 is a cross-sectional view showing the state before mounting a stamper of a positioning unit on a metal mold.

Referring to FIG. 2, the registration unit 60 includes a stamper holding unit 8 for holding or chucking a stamper 7, a centering head 9 mounted on the stamper holding unit 8 and a centering member 12 inserted into a spool bushing 11 mounted on the metal mold 10 in order to effect centering. The registration unit 60 is of the type for mounting the stamper 7 on the fixed metal mold 10. The stamper 7 is centered by the spool bushing 11 mounted at the center of the metal mold 10.

The stamper holding unit 8 is formed as a disc approximately equal in diameter to the stamper 7, and has a plurality of stamper sucking portions 13 on its outer rim portion for sucking and holding the surface of the stamper 7 carrying the pattern of lands and recesses corresponding to the information signals. The stamper sucking portions 13 are formed as a sucker formed of e.g. rubber and are provided at several separate positions for stability holding the stamper 7.

The centering head unit 9 is constituted by an RCC unit comprising a first plate 14 secured to a stamper mounting and dismounting arm 6, a second plate 15 secured to the stamper holding unit 8, a third plate 16 mounted between the first plate 14 and the second plate 15, and coil springs 17 mounted between the first plate 14 and the third plate 16 and between the second plate 15 and the third plate 16. The centering head unit 9 is universally centered by deformation of the coil springs 17.

The third plate 16 is supported by the coil springs 17 mounted between it and the first plate 14 and the second plate 15 facing the third plate 16. That is, the third plate 16 is maintained in a state of force equilibrium by being biased towards the stamper holding unit 8 by the coil spring 17 mounted between it and the first plate 14 and towards the stamper mounting and dismounting arm 6 by the coil spring 17 mounted between it and the second plate 15.

The centering member 12 is made up of a head portion 18 adapted to be inserted into a center hole of the stamper 7 and a columnar-shaped incipient portion 19 supporting the head portion 18. The head portion 18 is formed as a disc dimensioned to be introduced into the center hole of the stamper 7 and has a conically-shaped centering boss 21 for being intruded into an opening 20 in the spool bushing 11 provided in the metal mold 10 for centering the stamper 7.

The incipient portion 19 is movable in the left-and-right direction, that is in the axial direction, with ball bushing 38 mounted on the second plate 15 as a guide. The centering member 12 is perpetually biased in a direction of an arrow X in FIG. 2 by a compression spring 22 placed in a through-hole in the first plate 14.

Figure 8:
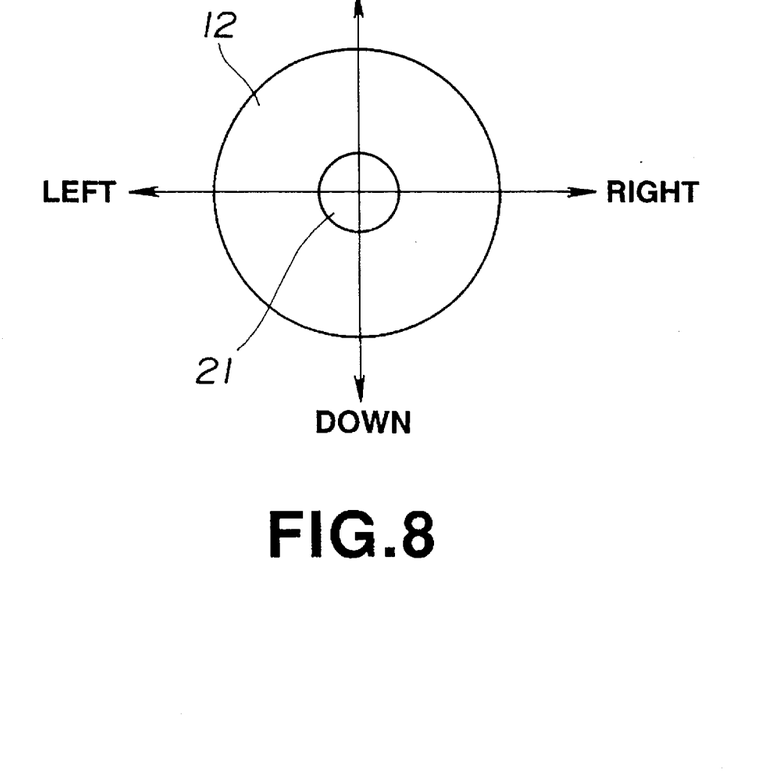
FIG. 8 illustrates a centering head being movable in the up-and-down direction and in the left-and-right direction.
Figure 9:
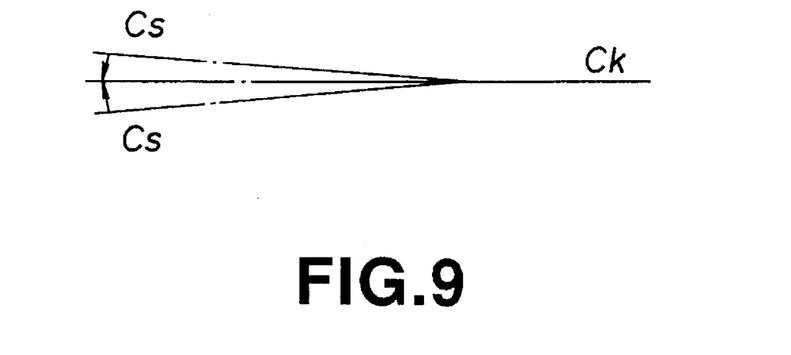
FIG. 9 illustrates a centering head being angularly adjustable with respect to the axial direction of the centering head.

The centering head unit 9, constructed as described above, is movable in the up-and-down direction and in the left-and-right direction, as shown in FIG. 8. Also, the centering head portion 9 is angularly adjusted in the axial direction, as shown in FIG. 9.

The metal mold 10 includes a stamper fixing mechanism for securing the stamper 7 mounted by the stamper mounting and dismounting unit 2 to the metal mold 10. The stamper fixing mechanism sucks the stamper 7 under vacuum for securing the stamper 7 on the setting surface of the metal mold 10.

That is, the stamper setting surface 10a of the metal mold 10 has a number of stamper sucking holes 23 sufficient to secure the stamper 7 in position, and a number of suction ports 24 communicating with these sucking holes 23. A suction pipe 25 leading to a terminal vacuum pump is connected to the opening ends of these suction ports 24. The suction volume is adjusted by a valve 26 at a mid portion of the suction pipe 25.

On the stamper setting surface 10a of the metal mold 10 is formed a hub ring 27, in the form of a circular protrusion, which is adapted to be fitted in the center hole of the stamper 7 for positioning the stamper 7.

The manner in which the stamper 7 is mounted on the metal mold 10 by the above-described registration mechanism 60 is now explained. Beginning from the state in which the stamper 7 is sucked by the stamper holding unit 8 as shown in FIG. 2, the stamper mounting and dismounting arm 6 is moved in the direction shown by an arrow X in FIG. 2 as far as a position shown in FIG. 3.

Figure 3:
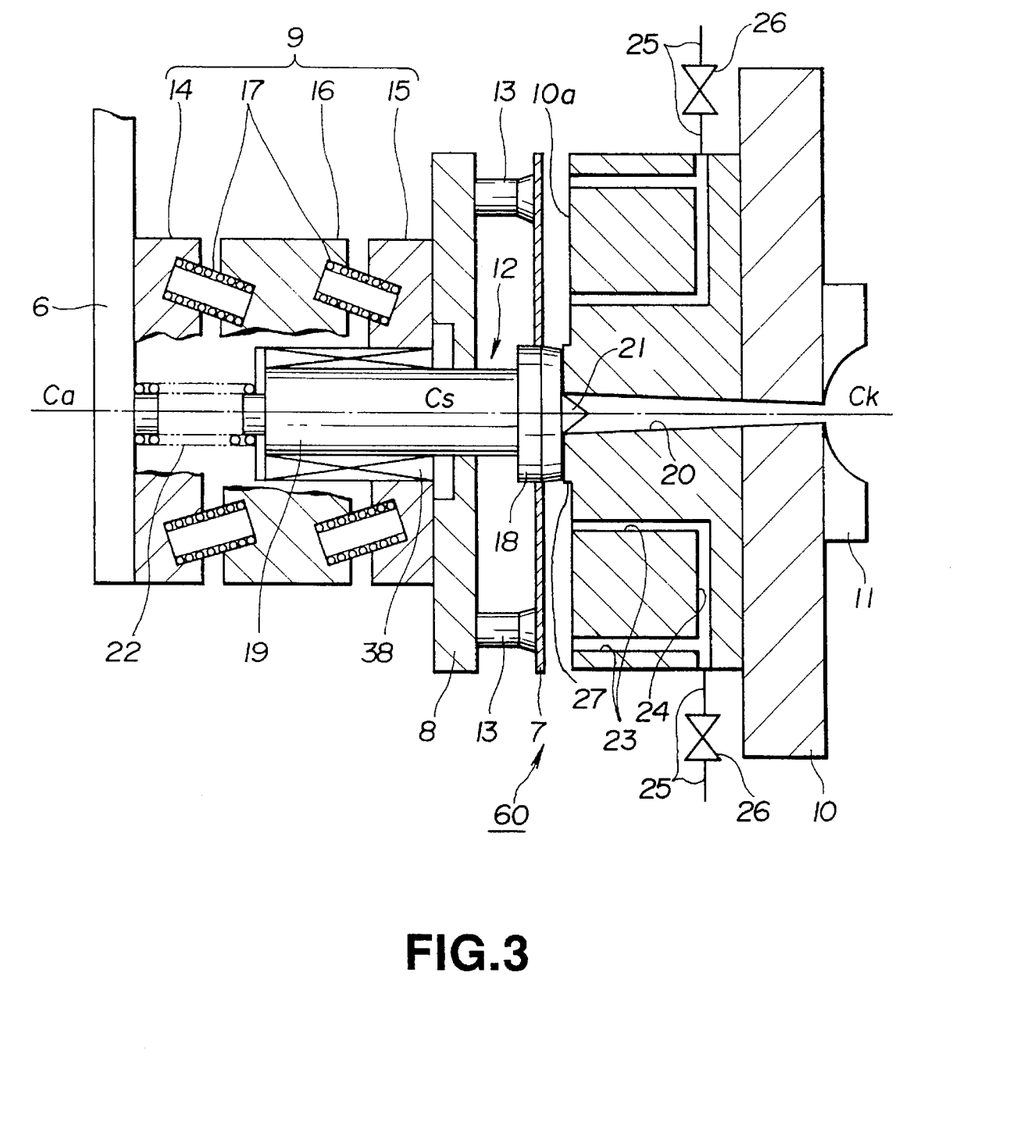
FIG. 3 is a cross-sectional view showing the state in which the stamper of the positioning unit is centered with respect to the metal mold.

This causes the centering boss 21 of the centering member 12 to be intruded into the opening 20 of the spool bushing 11 in order to effect centering. The centerline Cs of the centering member 12 is aligned at this time with the centerline Ck of the metal mold 10 and offset from the centerline Ca of the stamper mounting and dismounting arm 6.

Figure 4:
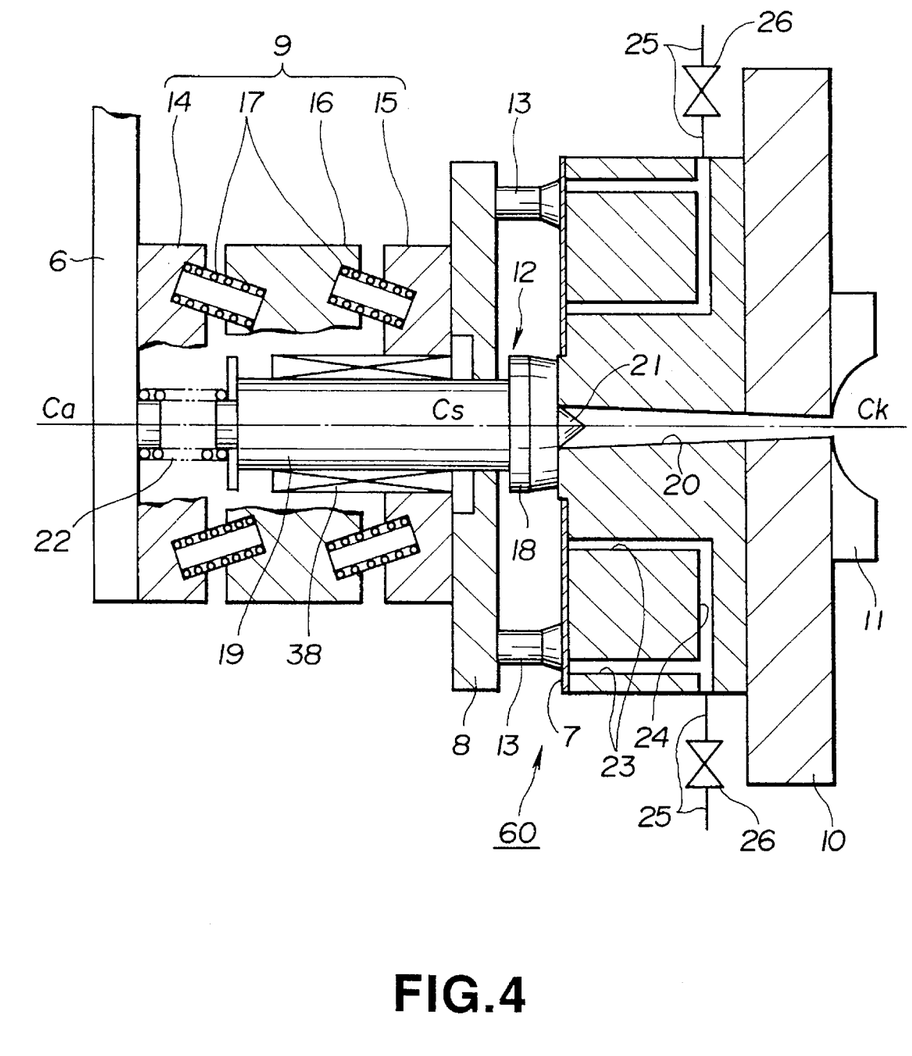
FIG. 4 is a cross-sectional view showing the state in which the stamper of the positioning unit is mounted on the metal mold.

If the stamper mounting and dismounting arm 6 is moved further from this state, the stamper 7 is mounted on a setting surface 10a of the metal mold 10 as the stamper is thrust against the metal mold 10 under the bias of the coil springs 17, 22. When the stamper 7 is mounted on the metal mold 10, the center ring member 12 is moved rearward. The stamper 7 is positioned relative to the metal mold 10 by the hub ring 27 of the metal mold 10 being fitted in the center opening in the stamper 7.

When the stamper 7 is mounted on the setting surface 10a of the metal mold 10, the stamper 7 has its rear surface sucked under vacuum onto the metal mold 10 by the operation of the vacuum pump via the stamper sucking holes 23 formed in the stamper setting surface 10a.

A stamper supply unit 50 for supplying the stampers 7 to the above-described stamper mounting and dismounting unit 2 includes a stamper transfer section 28 for exchanging the stamper 7 between it and the stamper mounting and dismounting unit 2, a stamper take-out section 29 for housing the stamper 7 in the stamper casing and taking out the stamper out of the stamper casing, a casing lid opening and closing section 30 for opening and closing the stamper casing lid, and a casing lift 31 for transporting the stamper casing between the stamper take-out section 29 and the stamper housing units 2, 3. Although not shown, the stamper casing houses each one stamper 7 and is made up of a main body portion for housing the stamper and a lid rotatably mounted on the main body portion.

The stamper transfer section 28 receives the used-up stamper held by the stamper mounting and dismounting unit 2 by vacuum suction or delivers a new stamper 7 to the stamper mounting and dismounting unit 2. The stamper transfer section 28 includes a holding portion 28a for holding the used-up stamper, a holding portion 28b for holding a new stamper and a base 28c carrying these holding portions 28a, 28b at its terminal ends, as shown in FIG. 1. The base 28c is rotated or slid for bringing one of the holding portions 28a, 28b in register with the stamper take-out section 29. The stamper is exchanged between the stamper take-out section 29 and the holding portions 28a or 28b facing the stamper take-out section 29. The stamper take-out section 29 houses the used-up stamper delivered thereto from the holding portion 28a of the stamper transfer section 28 in the stamper casing or takes out the new stamper from the stamper casing. The stamper thus taken out is supplied to the stamper take-out unit 2. The stamper take-out section 29 exchanges the stamper between it and the stamper casing by an arm-shaped member having a vacuum suction end portion.

The casing lid opening and closing section 30 plays the role of closing the stamper casing lid after housing the used-up stamper in the stamper casing, and also plays the role of opening the stamper casing lid when taking out the new stamper from the stamper casing.

The casing lift 31 transports the stamper casing housing the used-up stamper to the first stamper housing unit 3 or transports the stamper casing holding a new stamper to be housed in the second stamper housing unit 4 to the stamper take-out section 29.

The manner in which, in the above-described injection molding apparatus, a new disc substrate is molded by a stamper having new information signals thereon after a pre-set number of disc substrates have been molded by a stamper having certain information signals recorded, is hereinafter explained.

After the end of molding of the pre-set number of the disc substrates, the used-up stamper is dismounted from the metal mold 10 by the stamper mounting and dismounting unit 2. The used-up stamper is transferred to the stamper transfer section 28 from the stamper mounting and dismounting unit 2. The used-up stamper transferred to the stamper transfer section 28 is transferred to the stamper take-out section 29.

The used-up stamper is housed by the stamper take-out section 29 in the stamper casing. The stamper casing lid is closed by the casing lid opening and closing section 30. The stamper casing is then lowered by the casing lift 31 for housing the stamper casing in the first stamper housing unit 3.

A stamper casing is then taken out from the second stamper housing unit 4 housing a new stamper used for molding. The stamper casing is lifted by the casing lift 31 to the stamper take-out section 29.

The stamper casing lid is then opened by the casing lid opening and closing section 30 and a new stamper is taken out by the stamper take-out section 29. The stamper thus taken out is transferred to the stamper transfer section 28.

The stamper is transferred from the stamper transfer section 28 to the stamper mounting and dismounting unit 2. The new stamper held by the stamper mounting and dismounting unit 2 is mounted on the stamper setting surface 10a of the metal mold 10. The injection molding unit 1 then causes the polycarbonate resin to be injected into the cavity of the metal mold 10 for producing the disc substrate.

With the above-described injection molding apparatus, the operation of dismounting the used-up stamper from the metal mold or mounting the new stamper on the metal mold may be carried out automatically by an automatic exchange mechanism without the necessity of resorting to man-power. Thus there is no possibility of human errors such as contact with the stamper by the operator for avoiding the stamper contamination or injuries to the recording surface. In addition, it becomes possible to reduce the time required in the operational cycle of mounting and dismounting the stamper.

The following registration mechanism for aligning the center of the stamper with the center of the spool bushing may be employed instead of the above-described registration unit 60 in which the centering boss 21 of the centering head 12 is inserted into the opening 20 of the spool bushing 11.

Figure 5:
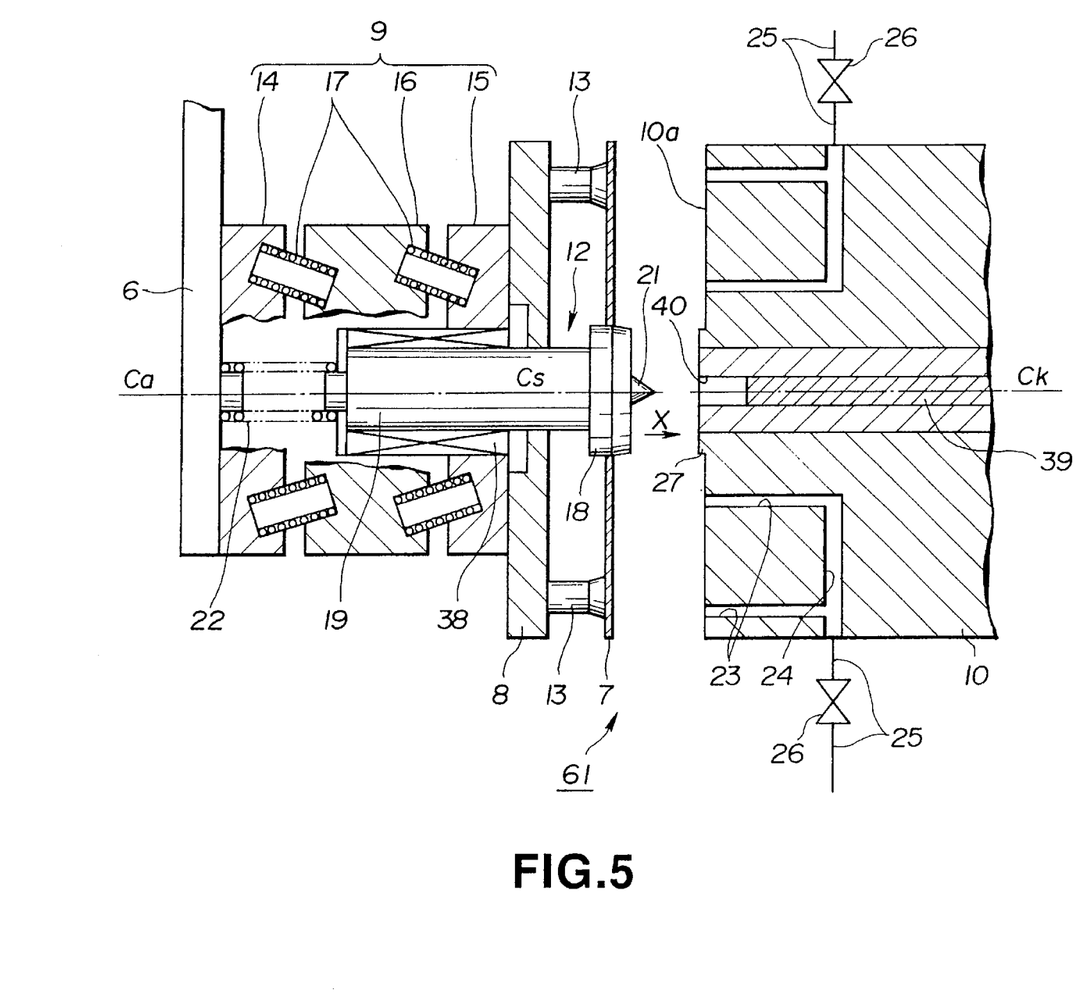
FIG. 5 is a cross-sectional view showing the state before mounting a stamper of a modified positioning unit on a metal mold.

The modified registration mechanism 81 is shown in FIG. 5, in which the stamper is mounted on the movable metal mold and centering of the stamper is achieved by taking advantage of an ejector pin hole formed at the center of the movable metal mold for ejecting the spool or the disc.

The construction of the registration unit 61 at the distal end of the stamper mounting and dismounting arm 8, shown in FIG. 5, is the same as the above-described registration unit 60 except that an ejector pin 39 is provided at the center of the metal mold 10 for extruding the spool or the disc. That is, the centering boss 21 of the centering head 12 is intruded into the ejector pin hole 40 of the ejector pin 39 for centering the stamper. Consequently, the structure for mounting the stamper mounting and dismounting arm 6 is not explained. In the drawings, common parts or components are depicted by the same reference numerals.

The stamper 7 is mounted on the metal mold 10 by the registration unit 61 in the same manner as with the registration unit 60.

The mounting on the metal mold 10 of the stamper 7 by the above-described modified registration unit 61 is achieved in the same manner as with the above-described positioning unit 60. That is, beginning from the state in which the stamper 7 is sucked by the stamper holding unit 8 as shown in FIG. 5, the stamper mounting and dismounting arm 6 is moved in the direction shown by an arrow X in FIG. 5 as far as a position shown in FIG. 6.

Figure 6:
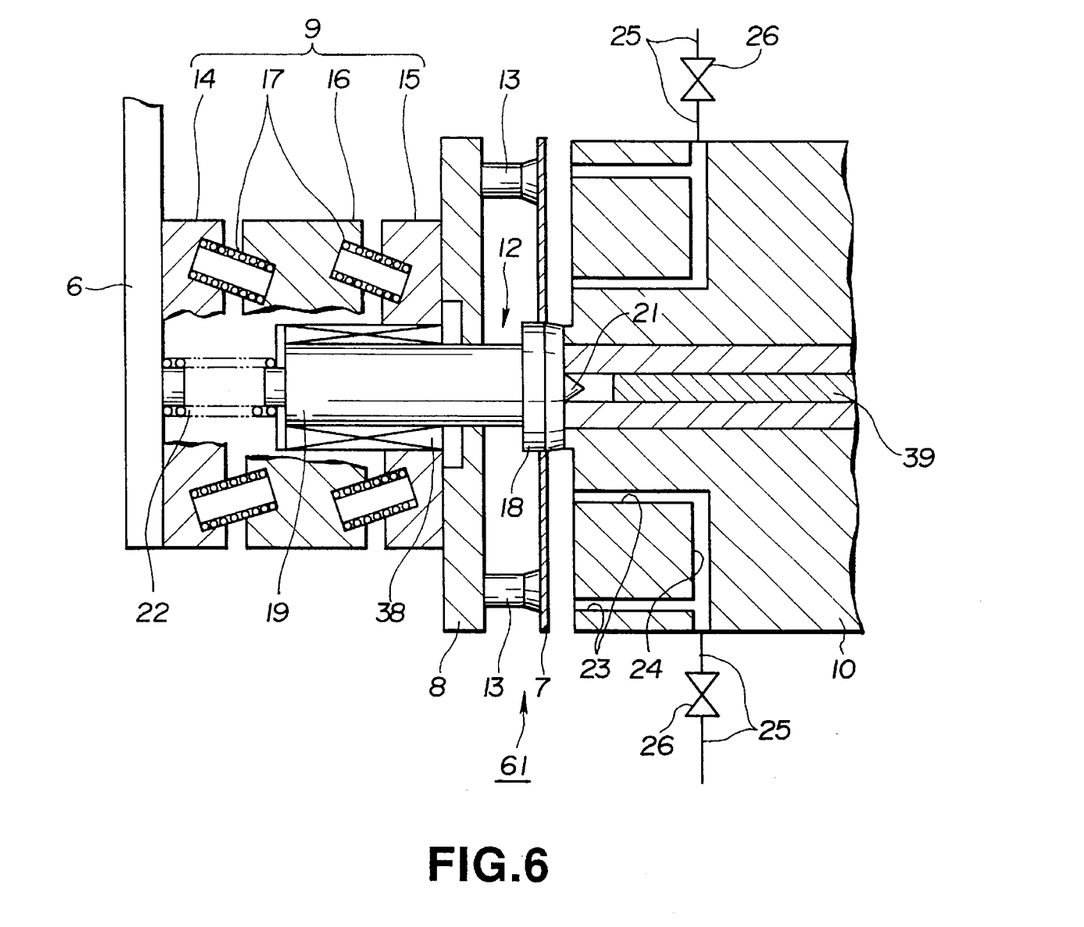
FIG. 6 is a cross-sectional view showing the state in which the stamper of the positioning unit shown in FIG. 5 is centered with respect to the metal mold.

This causes the centering boss 21 of the centering member 12 to be intruded into the ejector pin opening 40 of the ejector pin 39 in order to effect centering. The centerline Cs of the centering member 12 is aligned at this time with the centerline Ck of the metal mold 10 and offset from the centerline Ca of the stamper mounting and dismounting arm 6.

Figure 7:
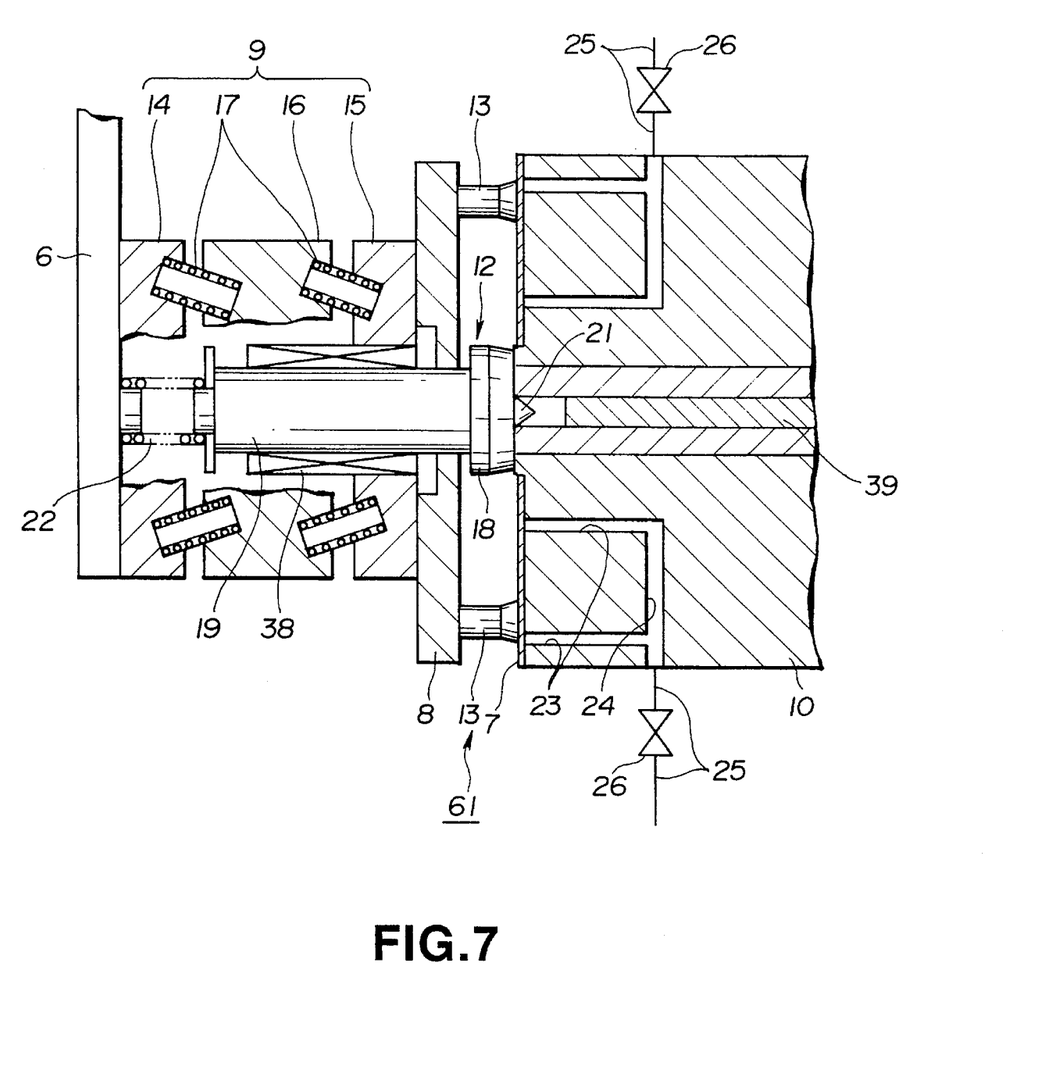
FIG. 7 is a cross-sectional view showing the state in which the stamper of the positioning unit shown in FIG. 5 is mounted on the metal mold.

If the stamper mounting and dismounting arm 6 is moved further from this state, the stamper 7 is mounted on the setting surface 10*a* of the metal mold 10 as the stamper is thrust against the metal mold 10 under the bias of the coil springs 17, 22, as shown in FIG. 7. When the stamper 7 is mounted on the metal mold 10, the center ring member 12 is moved rearward. The stamper 7 is positioned relative to the metal mold 10 by the hub ring 27 of the metal mold 10 being fitted in the center opening in the stamper 7.

When the stamper 7 is mounted on the setting surface 10*a* of the metal mold 10, the stamper 7 is secured under vacuum onto the metal mold 10 by the operation of the vacuum pump via the stamper sucking holes 23 formed in the stamper setting surface 10*a*. The subsequent process steps are carried out in the same manner as with the previous embodiment.

Although the foregoing description has been made taking an example of a stamper having pits corresponding to the information signals, the stamper may also be the stamper employed for molding a disc substrate for a recordable optical disc such as a magneto-optical disc. In such case, the stamper has formed thereon a pattern of lands and recesses for forming grooves on the disc substrate.

While the present invention has been described with reference to preferred embodiments, it is not limited to the details set forth therein and is intended to cover any modifications that come within the scope of the invention set forth in the following claims.

What is claimed is:

1. An automatic stamper exchange mechanism comprising:

a first stamper housing unit for housing a used-up stamper, a second stamper housing unit for housing a new stamper, stamper mounting and dismounting means for dismounting the used-up stamper from a metal mold or mounting the new stamper in the metal mold, and stamper supplying means for housing the used-up stamper dismounted by the stamper mounting and dismounting means in the first stamper housing unit or taking out the new stamper housed within the second stamper housing unit and supplying the new stamper thus taken out to said stamper mounting and dismounting means, wherein, after the end of an injection molding operation by the metal mold, the used-up stamper is dismounted from the metal mold by said stamper mounting and dismounting means so as to be housed within said first stamper housing unit, and the new stamper is taken out by said stamper supplying means from said second stamper housing unit so as to be mounted on the metal mold by said stamper mounting and dismounting means.

2. The automatic stamper exchange mechanism as claimed in claim 1 wherein said stamper mounting and dismounting means includes a registration mechanism for aligning the center of the new stamper mounted on the metal mold with the center of a spool bushing of said metal mold.

3. The automatic stamper exchange mechanism as claimed in claim 1 wherein said stamper mounting and dismounting means includes:

a holder for holding the new stamper, a registration mechanism for aligning the center of the new stamper held by said holder with the center of a spool bushing of the metal mold, and a mounting mechanism for thrusting the new stamper against the metal mold for mounting the new stamper on the metal mold with the center of the new stamper being aligned with the center of the spool bushing by said registration mechanism.

4. The automatic stamper exchange mechanism as claimed in claim 3 wherein said holder for holding the new stamper has a boss adapted for being intruded into an opening in the spool bushing provided at the center of the metal mold for aligning the center of the new stamper held by said holder with the center of the spool bushing of the metal mold.

5. The automatic stamper exchange mechanism as claimed in claim 3 wherein said holder for holding the new stamper has a boss for being intruded into an ejector opening containing an ejector pin formed at the center of the metal mold for extrusion of a spool or a disc in order to effect alignment of the center of the new stamper held by said holder with the center of the spool bushing of the metal mold.

6. An injection molding apparatus comprising:

a metal mold having holding means for holding a stamper on a setting surface; and an automatic stamper exchanging means that includes:
- a first stamper housing unit for housing a used-up stamper,
- a second stamper housing unit for housing a new stamper, and
- stamper mounting and dismounting means for dismounting the used-up stamper from the metal mold or mounting the new stamper in the metal mold;

wherein, after the end of an injection molding operation by the metal mold, the used-up stamper is dismounted from the metal mold by said stamper mounting and dismounting means so as to be housed within said first housing unit, and the new stamper is taken out by said stamper mounting and dismounting means from said second housing unit and mounted on said setting surface of the metal mold so as to be held by said holding means.

7. The injection molding apparatus as claimed in claim 6 wherein said stamper mounting and dismounting means includes a registration mechanism for aligning the center of the new stamper mounted on the metal mold with the center of a spool bushing of said metal mold.

8. The injection molding apparatus as claimed in claim 6 wherein said stamper mounting and dismounting means comprises thrusting means for thrusting the new stamper against said setting surface and wherein the new stamper is held on said metal mold by said holding means as the new stamper is thrust by said thrusting means onto said setting surface.

9. The injection molding apparatus as claimed in claim 6 wherein said automatic stamper exchange means further comprises a stamper supplying means for housing the used-up stamper dismounted by the stamper mounting and dismounting means in the first stamper housing unit or for taking out the new stamper housed within the second stamper housing unit and supplying the new stamper thus taken out to said stamper mounting and dismounting means.

10. The injection molding apparatus as claimed in claim 6 wherein said holding means comprises:

a plurality of suction holes formed in said setting surface, a vacuum pump, and a path interconnecting said vacuum pump and said suction holes; wherein the new stamper is held on said setting surface by sucking the new stamper mounted on the setting surface from the back side thereof via said suction holes by the vacuum pump.

11. The injection molding apparatus as claimed in claim 6 wherein said metal mold has positioning means for positioning the new stamper by being fined in a center hole of the new stamper.

12. An injection molding apparatus comprising:

a metal mold having holding means for holding a stamper on a setting surface; and an automatic stamper exchanging means that includes:
- a first stamper housing unit for housing a used-up stamper,
- a second stamper housing unit for housing a new stamper,
- stamper mounting and dismounting means for dismounting the used-up stamper from the metal mold or mounting the new stamper in the metal mold, and
- stamper supplying means for housing the used-up stamper dismounted by the stamper mounting and dismounting means in the first stamper housing unit or taking out the new stamper housed within the second stamper housing unit and supplying the new stamper thus taken out to said stamper mounting and dismounting means.

13. The injection molding apparatus as claimed in claim 12 wherein said stamper mounting and dismounting means comprises thrusting means for thrusting the new stamper against said setting surface and wherein the new stamper is held on said metal mold by said holding means as the new stamper is thrust by said thrusting means onto said setting surface.

14. The injection molding apparatus as claimed in claim 12 wherein said holding means comprises:

a plurality of suction holes formed in said setting surface, a vacuum pump, and a path interconnecting said vacuum pump and said suction holes.

\* \* \* \* \*

UNITED STATES PATENT AND TRADEMARK OFFICE
CERTIFICATE OF CORRECTION

PATENT NO. : 5,599,564
DATED      : February 4, 1997
INVENTOR(S) : KOICHI ISHIHARA ET AL.

It is certified that error appears in the above-indentified patent and that said Letters Patent is hereby corrected as shown below:

In Col. 10, line 9, please change "fined" to --fitted--.

Signed and Sealed this

Fifteenth Day of April, 1997

Attest:

BRUCE LEHMAN

*Attesting Officer*      Commissioner of Patents and Trademarks